US012627256B2

(12) United States Patent
Roch et al.

(10) Patent No.: US 12,627,256 B2
(45) Date of Patent: May 12, 2026

(54) DEVICE AND METHOD FOR SUNLIGHT-BASED POWER GENERATION

(71) Applicant: Voltiris SA, Lausanne (CH)

(72) Inventors: Jonas Roch, Lausanne (CH); Dominik Blaser, Bern (CH)

(73) Assignee: Voltiris SA, Lausanne (CH)

( * ) Notice: Subject to any disclaimer, the term of this patent is extended or adjusted under 35 U.S.C. 154(b) by 0 days.

(21) Appl. No.: 18/292,057

(22) PCT Filed: Jul. 19, 2022

(86) PCT No.: PCT/EP2022/070257
§ 371 (c)(1),
(2) Date: Jan. 25, 2024

(87) PCT Pub. No.: WO2023/006524
PCT Pub. Date: Feb. 2, 2023

(65) Prior Publication Data
US 2025/0047238 A1 Feb. 6, 2025

(30) Foreign Application Priority Data
Jul. 28, 2021 (EP) .................................... 21188265

(51) Int. Cl.
*H02S 40/22* (2014.01)
*H02S 20/32* (2014.01)

(52) U.S. Cl.
CPC .............. *H02S 40/22* (2014.12); *H02S 20/32* (2014.12)

(58) Field of Classification Search
CPC ................................. H02S 40/22; H02S 20/32
See application file for complete search history.

(56) References Cited

U.S. PATENT DOCUMENTS

| | | | | |
|---|---|---|---|---|
| 4,204,881 A * | 5/1980 | McGrew | ............... | H10F 77/488 |
| | | | | 136/246 |
| 4,620,771 A * | 11/1986 | Dominguez | .......... | G01S 3/7861 |
| | | | | 136/246 |
| 5,538,563 A * | 7/1996 | Finkl | ........................ | F24S 23/77 |
| | | | | 136/246 |
| 5,864,434 A * | 1/1999 | Taylor | ...................... | G02B 5/08 |
| | | | | 359/884 |

(Continued)

FOREIGN PATENT DOCUMENTS

| | | |
|---|---|---|
| WO | 2009002350 A1 | 12/2008 |
| WO | 2011041637 A2 | 4/2011 |
| WO | 2012093936 A2 | 7/2012 |

*Primary Examiner* — Sadie White
(74) *Attorney, Agent, or Firm* — Dinsmore & Shohl LLP

(57) ABSTRACT
The present invention relates to an energy generation device (1) comprising a reflection panel (11) presenting a reflecting surface, an energy generation module (12) and a holding structure (13) holding the reflection panel (11) and the energy generation module (12) together, wherein the reflection panel (11) is configured to filter an incident sunlight thereby letting a first portion of said sunlight pass through it and reflecting a second portion of said sunlight, characterized in that said reflecting surface presents a plurality of reflective regions (11', 11", 11'") differently oriented with respect to each other and each being configured to homogeneously reflect said second portion of incident light on a collecting surface of said energy generation module (12).

12 Claims, 5 Drawing Sheets

(56)　　　　　　　References Cited

U.S. PATENT DOCUMENTS

| | | | |
|---|---|---|---|
| 2001/0046087 A1* | 11/2001 | Hoose | G02B 5/1814 |
| | | | 359/566 |
| 2010/0212720 A1* | 8/2010 | Meyer | H02S 20/10 |
| | | | 136/246 |
| 2011/0061644 A1* | 3/2011 | Pizzarello | H02S 40/22 |
| | | | 126/714 |
| 2011/0126883 A1 | 6/2011 | Goldman | |
| 2012/0067337 A1 | 3/2012 | Hall et al. | |
| 2012/0152314 A1* | 6/2012 | Tanaka | H02S 40/22 |
| | | | 136/246 |
| 2013/0016431 A1 | 1/2013 | Taudien et al. | |
| 2016/0118930 A1* | 4/2016 | Chun | H10F 77/492 |
| | | | 136/246 |
| 2017/0012155 A1 | 1/2017 | Holman et al. | |
| 2017/0323992 A1 | 11/2017 | Elsarrag et al. | |
| 2019/0326850 A1* | 10/2019 | King | H02S 40/20 |
| 2020/0295213 A1* | 9/2020 | Pan | H10F 19/902 |
| 2020/0343852 A1* | 10/2020 | Chentnik | F21S 8/085 |
| 2020/0359571 A1 | 11/2020 | Pan | |
| 2021/0265943 A1* | 8/2021 | Severgnini | B60L 53/22 |
| 2022/0077817 A1* | 3/2022 | Caelers | H02S 40/22 |

* cited by examiner

DEVICE AND METHOD FOR SUNLIGHT-BASED POWER GENERATION

CROSS REFERENCE TO RELATED APPLICATIONS

This application is a U.S. National Stage under 35 U.S.C. § 371 of PCT/EP2022/070257 filed Jul. 19, 2022, which depends from and claims priority to European patent application number 21188265.9 filed Jul. 28, 2021, the entire contents of which are incorporated herein by reference.

TECHNICAL FIELD

The present invention relates to the field of sunlight-based power generation and more particularly to the field of sunlight-based power generation in agriculture. The present invention aims at providing a means for both power generation and agriculture growth optimization.

BACKGROUND OF THE ART

Nowadays, Photovoltaic (PV) power generation is seen as a green and low-cost source of energy world-wide as well as a key element paving the way to a fossil energy-free future. However, finding space for large PV projects remains challenging because by creating a PV field, one may either waste arable land or hurt biodiversity. For this reason, modern projects commonly called "Agrovoltaics" have been created which aim at promoting a double use of available land, in which a field of arable land could simultaneously be used for power generation as well as agricultural yield.

Two different approaches have been considered so far for agrovoltaics which are called partial shading and spectral filtering.

In the partial shading approach, semi-transparent, not particularly wavelength-selective, or opaque photovoltaic cells are placed above the field where the plants are growing and generate electricity while creating a partial shading on the plants by absorbing a portion of the light reaching the plants. The shading is characterized by a decrease in the light intensity but does not modify the spectral components of sunlight.

At northern latitudes, where sunlight is scarce in the winter half-year, the partial shading approach, as described for instance in US2017126172A1, is not applicable to all plant types. In the low light conditions of the winter half, reducing the amount of sunlight reaching the plants can be detrimental to the growth of some specific light-loving plant varieties. In some designs, for instance as in EP3798688A1, the transmission of the panels can be tuned to let more light reach the plants. However, when the transmission reaches 100%, no electricity generation can be performed without hindering plants growth. For this reason, the equilibrium between electricity generation and plant's growth may be very complicated to obtain.

On the other hand, the spectral filtering approach differs radically from the previous approach, as one uses special PV panels wherein only a set of selected wavelengths will be allowed to reach the plants. In this solution, a colored filter (dichroic filter) or a wavelength-selective type of PV cell is used to separate the light components benefitting plant's growth from the rest of the solar spectrum. Those wavelengths not useful for plant's growth are then used for energy generation (PV or heat concentration). The advantage of the spectral filtering approach is that independently of the light conditions, plants will receive the same amount of light necessary for their growth as if there was no spectral filtering. In turn, even in the months with low insolation, the PV system will generate electricity with a similar efficiency as in the sunnier months.

In the spectral filtering approach, the use of wavelength-selective semi-transparent solar cells has been investigated (for instance in US2012198763A1). However, the light transmission of these solar cells has to date never reached transmission as high as thin-films filters, hence also creating a partial shading detrimental to plant's growth and the photon-electron efficiency has remained rather low.

In addition, in recent years, thin-film dichroic filters have been already used in a variety of setups within the domain of agrovoltaics, for example in WO2016093397A1 presents a system with a separation between the focusing optics and the spectral separation. However, by adding optical elements to the system, the system is harder to clean, creates additional interfaces in the light path and hence decreases the overall efficiency.

As thin-film filters have their bandwidth inherently dependent on the light's angle of incidence, systems with fixed orientation given by external factors (e.g. greenhouse orientation, choice of roof-like structure orientation, latitude . . . ), such as in WO2021012003A1, CN106538294A, FR3019885A1 or WO2015158968A1 will need a redesign of the filter depending on the geometry of the setup.

WO2017024974A1 presents another conventional system which is a Cassegrain system where the light useful for plants' growth is reflected by the primary and secondary mirrors to reach the plants. Such a system has a finite aperture and only mostly direct light can get to the crops. On a cloudy day, the light intensity reaching the plants would be decreased significantly. Moreover, manufacturing a large paraboloid mirror has a significant cost.

There is therefore a need for such a system which solves the problems of Prior Art recited above.

In this regard, a primary object of the invention is to solve the above-mentioned problems and more particularly to provide a system permitting an enhanced energy or power generation while simultaneously providing a proper and maximum light amount to the plants in the target land.

Another object of the invention is to provide a system permitting to optimize the energy or power generation at any time of the day and in any season.

Another object of the invention is to provide a system permitting to optimize the light amount arriving at the plants in the target land according to the variety and/or the density of plants.

One object of the invention is to optimize the reflection/collection structure to obtain the highest light transmission to the plants with the least shadow possible while collecting light to create energy.

SUMMARY OF THE INVENTION

The above problems are solved by the present invention which introduces a light-weight light-filtering off-axis reflector design presenting several facets and ensuring a homogeneous illumination on an energy generating module to optimize a high energy or power yield in a low-concentration energy or power generating system. For example When the energy generating module is a PV system, the homogeneous illumination optimizes the PV yield in a low-concentration PV system. The spectral filtering module let the necessary sunlight components, i.e. wavelengths, reach the plants located behind the reflector. Also, the light-weighted structure allows for a simple sun tracking system.

A first aspect of the invention is an energy generation device comprising a reflection panel presenting an at least partial reflecting surface, an energy generation module, and a holding structure holding the reflection panel and the energy generation module together, wherein the reflection panel is configured to filter an incident sunlight thereby letting a first portion of said sunlight pass through it and reflecting a second portion of said sunlight, characterized in that said reflecting surface presents a plurality of reflective regions differently oriented with respect to each other and each being configured to homogeneously reflect said second portion of incident light on a collecting surface of said energy generation module. Thanks to this, the device permits an enhanced energy power generation while simultaneously providing a proper and maximum light amount to the plants in the target land. In addition, the device permits to provide a possible modification of the light spectrum for better plant growth.

According to a preferred embodiment of the present invention, the transmission/reflection/refraction index of the material(s) of the reflection panel is configured to be tuned to let pass light with a specific wavelength range. In this manner, the ratio of light transmitted to the plants versus light used for producing energy is optimized.

Advantageously, the transmission/reflection/refraction of the reflection panel is adapted through specific materials and/or specific thickness ranges and/or specific surface treatments and/or specific additives. Thus, the reflective panels may be adapted to any type of plants and/or energy generation yield.

Preferably, the energy generation device comprises an orientation system adapted to modify the orientation of the reflection panel and of the energy generating module. Thus, one can adapt the position to the incident sunlight.

According to a preferred embodiment of the present invention, the orientation system comprises a tilting module and a pivot module adapted to modify the orientation of the reflection panel in two directions perpendicular to each other. In this manner, the reflection panel may be positioned in the best orientation with respect to the incident sunlight.

Advantageously, the energy generation device comprises a sun tracking system adapted to determine the sun orientation/position or/and the sunlight direction. Thanks to this, a user continuously knows the best orientation of the reflection panel with respect to the incident sunlight.

Preferably, the energy generation device comprises a control system adapted to control the orientation system on the basis of the data received by the sun tracking system. Thus, the efficiency is improved since the reflection panel is always facing the best direction with respect to the incident sunlight.

According to a preferred embodiment of the present invention, the plurality of reflective regions are flat and/or adjacent surfaces. Thus, the homogeneity of the reflected light is even more improved.

Preferably, the reflection panel is a dichroic mirror made of at least two facets/lamellas. In this manner, the homogeneity of the reflected light is even further improved.

Advantageously, the facets/lamellas are assembled together through a holding structure or are constituting a single piece. Thanks to this, they are either more modular or solid and easy to produce.

According to a preferred embodiment of the present invention, the holding structure is adapted to connect an end of the reflection panel to an end of the energy generation module such that the module is off centered with respect to the reflection panel. In this manner, the energy generation module does not project any shadow on the reflection panel thereby further enhancing its efficiency.

Advantageously, the energy generation module is chosen in the group comprising at least one of an electricity generation module using at least one of photovoltaic cells, a module for heat generation and a module for hydrogen production. Thus, several types of energy may be produced even simultaneously.

Preferably, the backside of the energy generation module presents a reflective surface, a light scatterer, contains fluorescent materials and/or an energy-generating surface. In this manner, the incident light is further used to create energy or reflected to the plants.

A second aspect of the invention is the energy generation system comprising a plurality of energy generation devices according to the first aspect of the invention, characterized in that it comprises one or several beams each holding a plurality of devices from the bottom part and/or cables hanging the energy generation devices from the top. Thanks to this, an entire field may be advantageously and easily provided with the energy generation devices of the present invention Further advantages of this device of the invention are briefly explained below.

A thin-film dichroic mirror has a non-zero cost. Designs with a parabolic/cylindrical mirror will have their PV panel shading some of the dichroic mirror areas, hence wasting resources. Also, the PV panel creates some shading on the plants as it is normal to the sunlight. With the present invention, the problem is solved by using an off-axis mirror, which creates a non-normal incidence for the sunlight reflected on the back of the PV panel. This creates a regulation mechanism, where at low sun elevation, sunlight is reflected on the back of the PV panel to the plants.

The system of the present invention has a light-weight structure that allows for the orientability of the solution, even when geometrical constraints are present. The use of a fit-in all solution is therefore simplified. The structure is also optimized to have a minimal shading to the plants.

The simple one-optical-interface structure allows for maximal light transmission to the plants, also in the case of indirect sunlight.

BRIEF DESCRIPTION OF THE DRAWINGS

Further particular advantages and features of the invention will become more apparent from the following non-limitative description of at least one embodiment of the invention which will refer to the accompanying drawings, wherein FIGS. 6A and 6B represent an embodiment of the present invention with an arrangement using several reflectors, where cables are used to perform the orientation of several reflectors at once, FIG. 7 represents a sketch and variable definition for a reflector design according to the present invention.

DETAILED DESCRIPTION OF THE INVENTION

The present detailed description is intended to illustrate the invention in a non-limitative manner since any feature of an embodiment may be combined with any other feature of a different embodiment in an advantageous manner.

Figure 1:
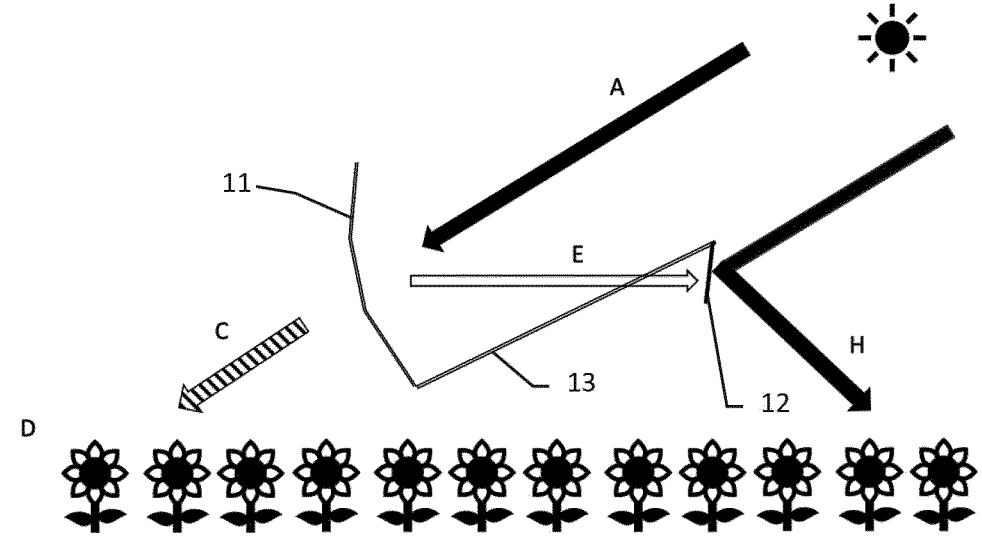
FIG. 1 represents the general concept of the present invention.

FIG. 1 depicts the general concept of the invention where sunlight A is directed toward a target land D and above this land is provided an energy generation device 1 according to the present invention. The term "above" may have its natural meaning, but in the case of vertical garden the same term should be understood as "in front", in summary the meaning of this term should therefore be understood as "between the plants and the light source". The energy generation device 1 is configured to intercept the sunlight at least partially, with a reflection panel 11 which is adapted to let some light (arrow C) pass to reach the plants and to stop the rest of the light, i.e. the light which is not needed by plants (arrow E), by reflecting it, redirect it and concentrate it homogeneously on an energy generation module 12 adapted to produce energy thanks to the reflected light. According to a preferred embodiment, the produced energy is electricity through photovoltaic cell(s), but it can be thermal energy or hydrogen production instead.

More particularly, the energy generation device 1 is configured to permit the light needed for plants' growth (arrow C) to be near-to-fully transmitted to the plants D which are therefore located behind (or below) the energy generation device 1. The passing criteria is preferably the wavelength of the light.

Figure 2A:
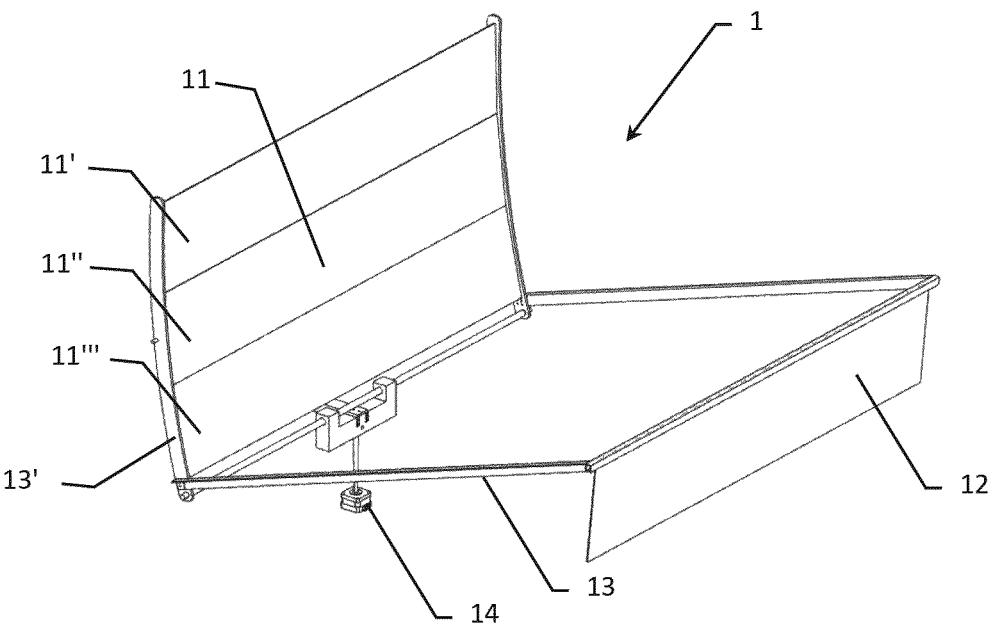
FIGS. 2A and 2B represents schematically represent the first embodiment of the present invention FIGS. 3A and 3B schematically represent an embodiment of the present invention with an alternative circular holding structure

A first embodiment of the energy generation device 1 of the present invention will now be described by reference to FIGS. 2A and 2B. Basically, the energy generation device 1 comprises a reflection panel 11, a holding structure 13 and an energy generation module 12.

According to this first embodiment, the reflection panel 11 preferably comprises a dichroic mirror preferably made of at least two facets/lamellas 11', 11", 11"', three are represented in the figures, such that the sunlight is preferably at least partially reflected off said facets 11', 11", 11"' of the reflection panel 11. The facets/lamellas 11', 11", 11"' may be attached together through a holding structure 13' as shown in FIGS. 2A and 2B or may, alternatively, consist in a single piece (not shown) presenting an inner surface made of at least two plane surfaces and differently oriented so as to focus the reflected light homogeneously to a specific area, preferably corresponding to the collecting surface of the energy generation module 12 so as to obtain an homogeneous insolation on the solar energy generation module thereby optimizing the light collection.

Figure 8:
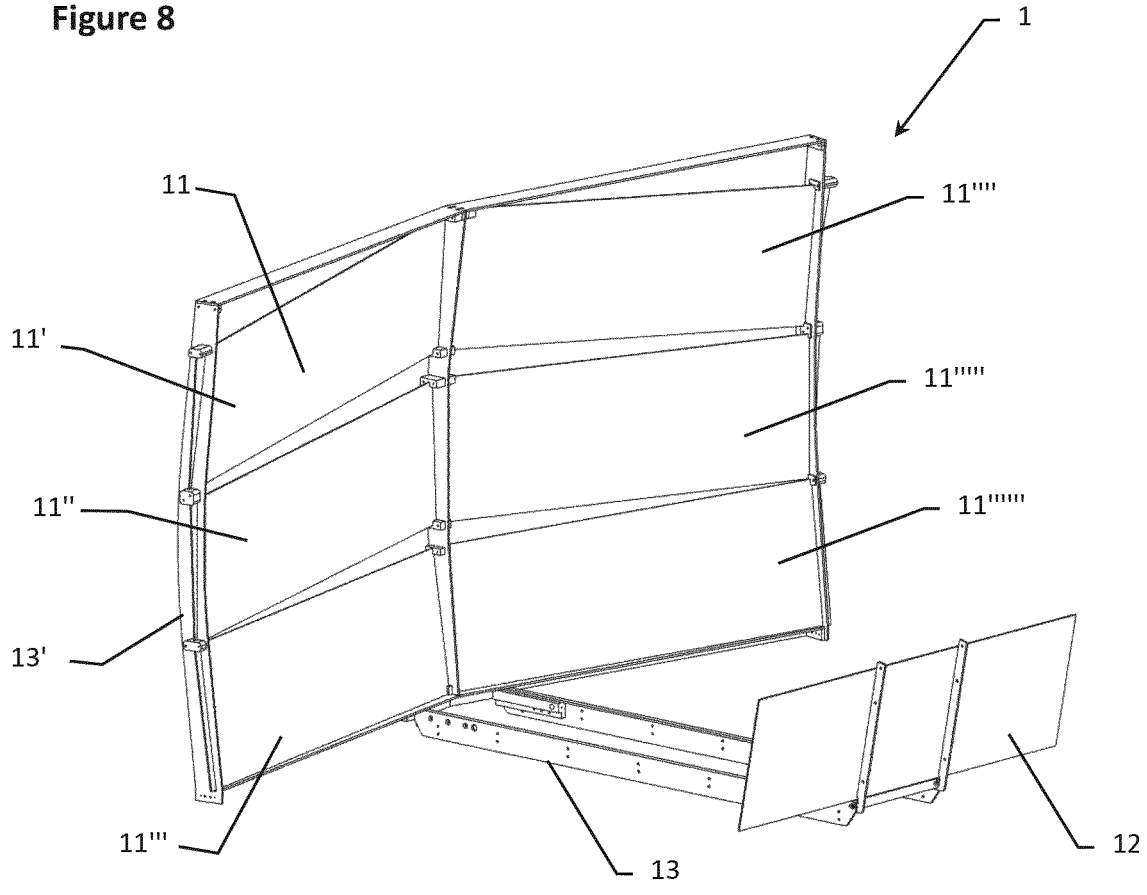
FIG. 8 represents a second embodiment of the present invention.

The plurality of reflective regions (11', 11", 11"') are preferably flat and may be provided in an adjacent manner. Alternatively, according to a second embodiment, each of the lamellas (11', 11", 11"', 11"", 11""", 11"""") providing the reflective regions, may be split into two-parts so as to present a V shape as shown in FIG. 8. By V shape it is meant that one (or several) reflective regions may be vertically distorted so as to present two surfaces with an angle with respect to each other. This may permit to solve the problem of shadow when an obstacle is on the light path such that the shadow of the obstacle corresponds to the distortion. In case of a vertical distortion, this permits to cross-reflect the light (the left reflection surface reflects the light to the right portion of the energy generation module and the right reflection surface reflects the light to the left portion of the energy generation module). In other words, the embodiment of FIG. 8 shows a reflection panel comprising six lamellas oriented in such a way that the reflected light is concentrated by a factor of three in the vertical direction, and a factor of two in the horizontal direction. By increasing the concentration factor, the power output from the power generation module becomes less dependent on eventual partial shading on the reflection panel.

As explained above, the reflection panel 11 filters the light which can pass to reach the plants, and which is reflected to the energy generation module. The filtered parameter is preferably the wavelength of the light. According to the type of plant/crop, which is to be illuminated, the transmission/ reflection/refraction index of the reflection panel 11, or more precisely the transmission/reflection/refraction index of the material(s) constituting the reflection panel 11, is being tuned to let pass a specific wavelength range and reflect another specific wavelength range. For example, a filter letting wavelength ranges below 470-530 nm (depending on the carotenoids, anthocyanin, etc. content in the plant's leaves/fruits) and wavelengths from 630 to 780 nm transmitted to plants will cover the area where typical photosensitive plants constituents (chlorophylls, cryptochromes, phototropins, carotenoids, phytochromes . . . ) are most absorbing.

In order to tune the transmission/reflection/refraction of the of the reflection panel 11, specific materials and/or specific thickness ranges and/or specific surface treatments and/or specific additives can be used. A dichroic filter can be for instance be made from the deposition of several hundred-of-nanometers-thick layers of metal oxide on a glass substrate. A cheaper alternative would be to use a multi-layer polymer filter for example by sticking it onto a substrate such as glass, polycarbonate or acrylic or any other UV stable polymer. Other options, such as plasmonic filters could be also considered. According to other embodiments, the backside of the reflection panel, i.e. not the side with the surface treatment, can be made with frosted or diffuse glass and/or can have an Anti-Reflection (AR) coating.

The energy generation module 12 is preferably one or more photovoltaic cells but it can also be a module for heat generation, and/or a module for hydrogen production and the like. The reflection panel 11 and the energy generation module 12 are preferably held by a lightweight holding structure 13, 13' which is conceived in such a way that a maximum amount of light (direct and indirect) reaches the plants and is therefore optimized to prevent shadow on the plants, i.e., presenting the smallest intercepting surface possible.

Furthermore, in order to maximize the amount of light transmitted to the plants, the backside (the side facing away from the reflection panel 11) of the energy generation module 12 can be adapted (with the provision of a mirror and/or a specific tilt orientation, for example) to reflect some parts of the light back to the plants (arrow H of FIG. 1). It could also be a light scatterer to let diffuse light reach the plants, or it could be containing fluorescent materials to ensure an up/down-conversion of non-photosynthetically active photons into photosynthetically active photons or it could be an energy-generating surface. However, if optimized energy production is needed, the energy-generating module could be bi-facial. The energy generation module could also be coupled to a heat sink.

The holding structure 13, 13' of the energy generation device is also designed to simplify the module orientation. The frame of the holding structure 13 holding the reflection panel 11 and the energy generation module 12 together can have a rectangular shape, as shown in FIG. 2A, or a polygonal or circular shape, as shown in FIG. 3A. It is preferably a hollow structure provided with an empty space in the middle of the holding structure 13 thereby presenting the thinnest surface so as to minimize the light intercepted by said structure. The holding structure 13 can be made from one single mechanical piece or from several elements attached to each other. The holding structure should be light and strong. Metals such as iron, titanium or aluminum can be used. The use of composite materials such as carbon reinforced composites or glass fiber composites could also come as handy. UV resistant polymers can also be used for the smaller parts. The empty space in the holding structure 13 helps a high optical transmission of indirect light but can also help orient the structure to lower its wind resistance in case of high winds.

Preferably, the holding structure is adapted to connect an end of the reflection panel to an end of the energy generation module such that the module is off-centered (or off-axis) with respect to the reflection panel. Even more preferably, the holding structure connects a lower end of the reflection panel to an upper end of the energy generation module. The term end here should be understood as edges (lower and upper edges).

Figure 4:
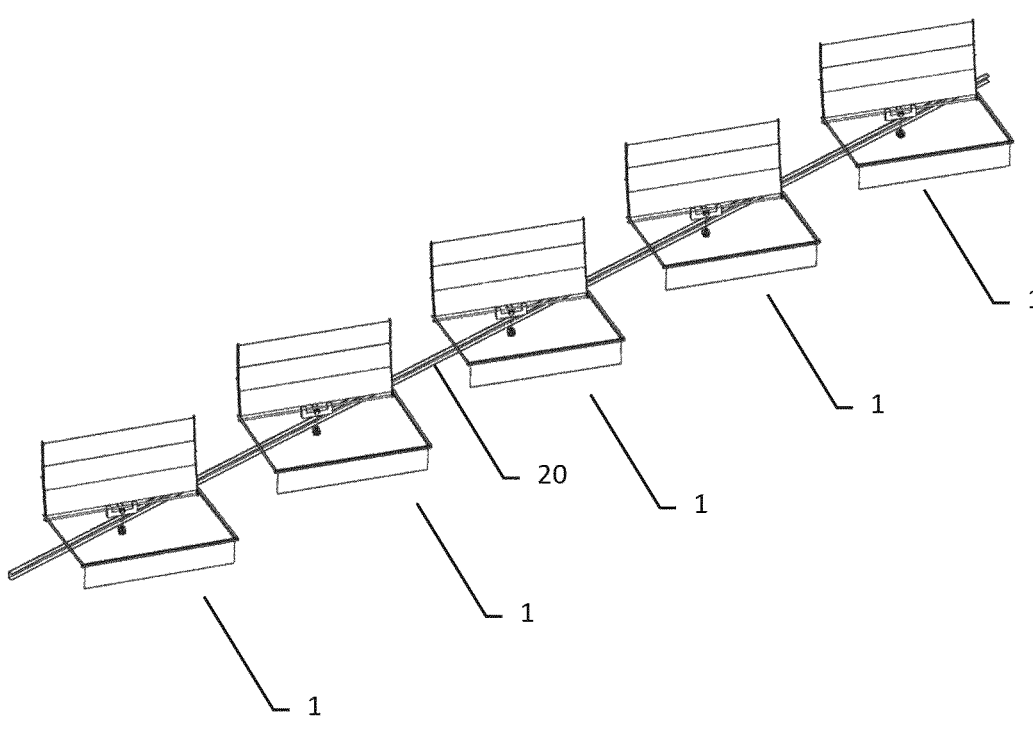
FIG. 4 represents an embodiment of the present invention with reflectors on a metallic profile forming a 1D array of reflectors
Figure 5:
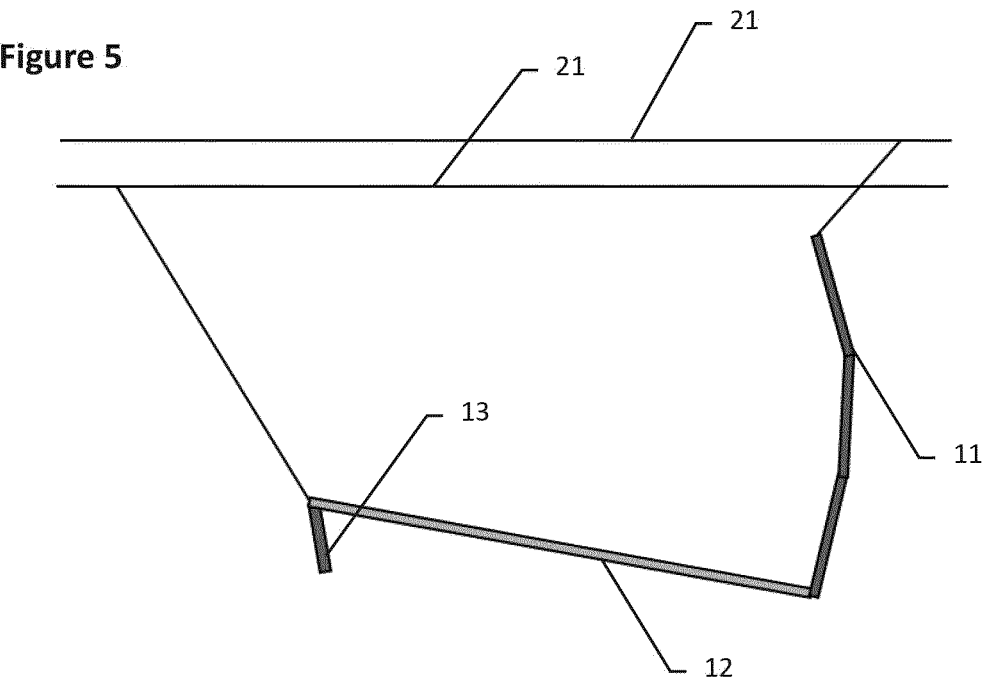
FIG. 5 represents another embodiment of the present invention with an orientation mechanism using cables.

Upon use, several energy generation devices 1 as shown in FIG. 2 are used simultaneously to optimize the generation of energy according to the type of target land and type of crop. In order to hold these devices, the whole system is designed to provide one or several beams 20 each holding a plurality of devices 1 as shown in FIG. 4. This shows one option of holding the energy generation devices 1 from the bottom part. Alternatively, it would also be possible to hang the energy generation devices 1 from the top using for instance some cables 21, as shown in FIG. 5.

Finally, an arrangement combining one or more beams 20 each holding a plurality of devices 1 from the bottom part and cables 21 hanging the energy generation devices 1 from the top can also be provided.

In order to improve the power generation per energy generation devices 1, it is preferable that the light reflected by the panel covers the whole surface of the power generation module. Additionally, it presents its reflection surface in an orientation facing the sunlight so as to maximize/optimize the quantity of reflected light reaching the power generation module. In order to achieve this all day long, and all year long, it preferably comprises a sun orientation tracking system (not represented) and motorization system such that the orientation of the device 1 can be motorized in order to track the Sun's motion. For example, each device 1 can have a set of actuators 14, 15 shown in FIGS. 2A and 2B, which can tilt and or pivot the energy generation device 1. In the example of FIGS. 2A and 2B, the tilting of the module is preferably obtained with the use of non-captive stepper motors.

Figures 2B, 3A, 3B:
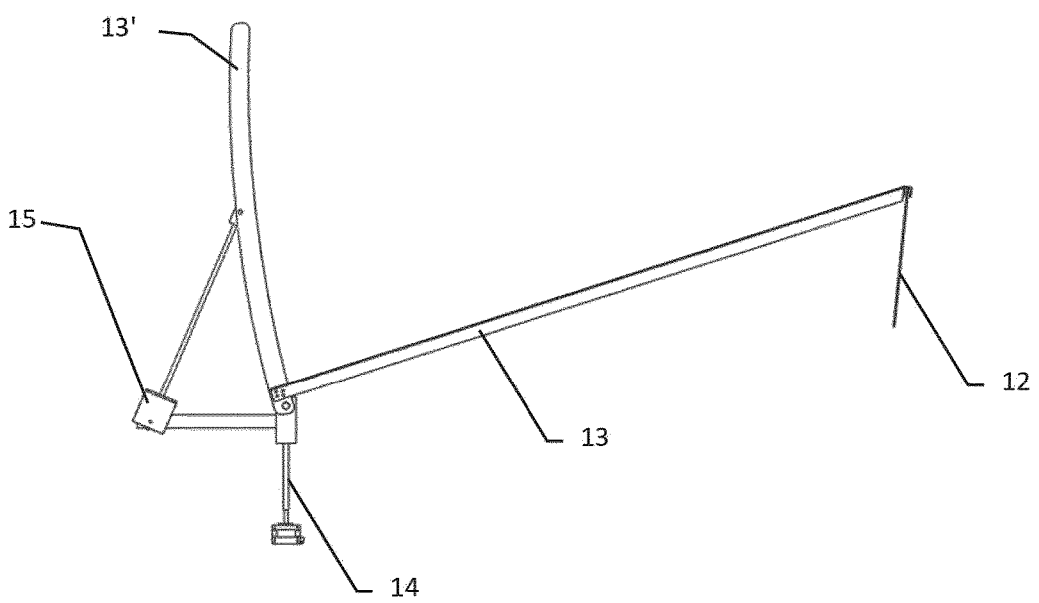

Another embodiment of the mechanism to perform the sun tracking is shown in FIGS. 3A and 3B and comprises a ring structure 16 on which sliders 17 will move a rectangular holding structure 18 bearing the device 1. The second axis movement (tilting) is ensured by a rotation axis (M) in the central frame 13.

The orientation mechanisms, as depicted in FIGS. 2A, 2B, 3A and 3B are preferably based on an altazimuth mount. A system using gimbals, reproducing an equatorial mount could also be used for the same purpose.

Figures 6A, 6B, 7:
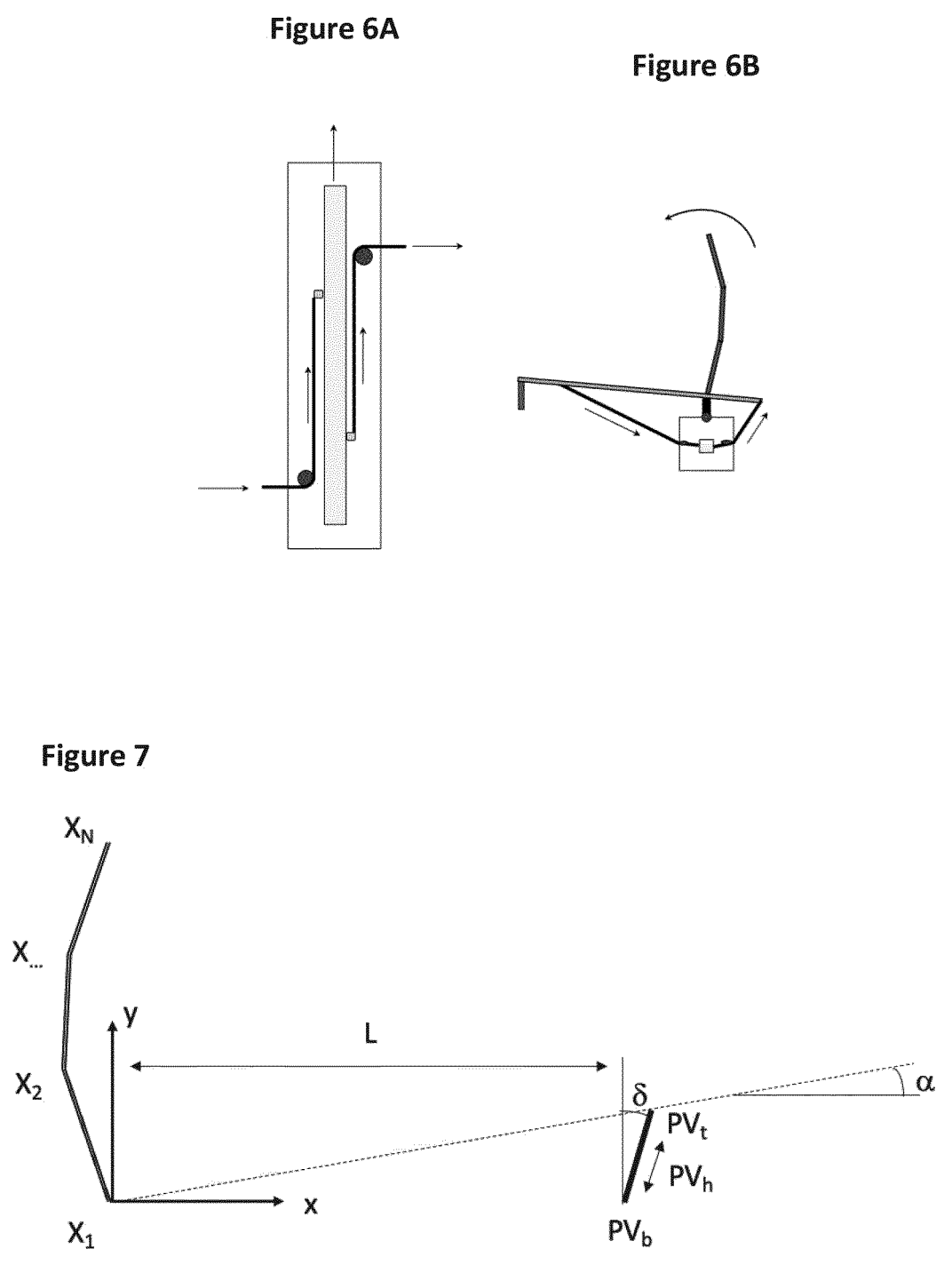

As mentioned earlier, the reflection panel 11 can comprise of a single reflector but also of a 1D or 2D array of reflectors. FIGS. 6A and 6B show a first embodiment for mounting several energy generation devices 1 on a metallic profile (beam 20). Here, in order to avoid having a set of actuators 14, 15 on each energy generation device 1, a timing belt 18 is used with a motor at the profile extremity to perform the azimuthal motion of the complete line of reflectors. A mechanism with a single cable embedded in the profile, as in FIG. 6B can be used to track the Sun's declination using deviations, however a system with several cables carrying out the same task could be used instead.

The geometry of the reflection panel 11 is optimized to ensure a homogeneous illumination on the energy generation module 12. Preferably said geometry shall follow a mathematical formula to compute the endpoints of the lamellas.

Referring to FIG. 7, let's consider a reflection panel 11 made from N−1 lamellas 11', 11', . . . (or presenting N−1 differently oriented surfaces), with the bottom of the reflection panel 11 (point X1=(0,0)) at the origin of the coordinate system, and the bottom of the energy generation module 12 (point $PV_b$) with coordinates (L,0). The energy generation module 12 has a length $PV_h$ and is tilted by an angle δ with respect to the y-axis, such that the coordinates of the top of the energy generation module 12 are $PV_t=(L+PV_h*\sin(δ), PV_h*\cos(δ))$.

The Sun elevation angle at which the shade of the energy generation module 12 is projected to X1 is $α=a \tan (PV_h*\cos(δ)/(L+PV_h*\sin(δ)))$. $n_f$ is the unity vector pointing towards the Sun from the origin, $n_f=[\cos(α); \sin(α)]$.

From the variable described in the previous paragraphs, the extremity points of the lamellas 11, 11', . . . can be iteratively computed. Knowing a lower extremity point of a lamella 11 $X_i$, the upper extremity $X_{i+1}$ can be computed as following:

The unity vector showing the direction of the reflected light (bottom of a lamella goes to the bottom of the PV panel) is $n_x=(PV_b−X_i)/|PV_b−X_i|$. The unity vector normal to the lamella is half-way between reflection and sunlight: $n_M=(n_f+n_x)/|n_f+n_x|$. $n_M$ vector has coordinates $n_{M,x}$ and $n_{M,y}$. The unity vector $n_{Mp}$ tangent to the mirror lamella pointing upwards has coordinates $(−n_{M,y};n_{M,x})$. In order to find the length of the lamella, one solves the following linear equation system $X_i+a*n_{Mp}=PV_t+b*n_X$ to find a and b. The equation finds the point on the lamella with surface defined by $n_M$, where reflected rays will reach the top of the PV module. The value of a solving the equation is the length of the lamella. The upper extremity of the lamella will be $X_{i+1}=X_i+a*n_{Mp}$. The extremities of the next lamella can be computed the same way, starting from $X_{i+1}$ to compute $X_{i+2}$. For a reflector with N−1 lamella, the extremities have to be computed up to $X_N$.

The tilt of the energy generation module 12 δ can be tuned in order to reduce the reflected light's incidence angle on the panel. At the same time, the tilt allows a reflection of sunlight at the back of the panel on the plants at small sun elevations.

While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the scope of this disclosure. This for example particularly the case regarding the different apparatuses, materials, angles which can be used. Furthermore, it should be intended that the system and the device of the present invention is adapted to be used outdoor, i.e. in an open-field, or indoor, for example, in a greenhouse.

The invention claimed is:

1. An energy generation device comprising a reflection panel presenting a reflecting surface, an energy generation module, and a holding structure holding the reflection panel and the energy generation module together, wherein the reflection panel is configured to filter an incident sunlight thereby letting a first portion of said sunlight pass through the reflection panel and reflecting a second portion of said sunlight, characterized in that said reflection panel is a single piece panel comprising a plurality of differently oriented adjacent reflective lamellas, wherein a position and an orientation of each lamella of said plurality of differently oriented adjacent reflective lamellas is based on a length and a tilt angle of the energy generation module, a distance between the lamella and the energy generation module, and a size and orientation angle of a neighbor lamella such that each lamella homogeneously focuses said second portion of incident light on a collecting surface of said energy generation module, wherein the holding structure connects the reflection panel to the energy generation module such that the reflection panel reflects light onto the energy generation module at a fixed angle.

2. The energy generation device according to claim 1, wherein:

the reflection panel comprises a material having a transmission index, a reflection index, or a refraction index, and the transmission index, the reflection index, or the refraction index are tuned to let pass light with a specific wavelength range.

3. The energy generation device according to claim 1, wherein the reflection panel comprises specific materials and/or specific thickness ranges and/or specific surface treatments and/or specific additive for tuning a transmission index, a reflection index, or a refraction index of the reflection panel.

4. The energy generation device according to claim 1, further comprising an orientation system adapted to modify an orientation of the reflection panel.

5. The energy generation device according to claim 4, characterized in that the orientation system comprises a tilting module and a pivot module adapted to modify the orientation of the reflection panel in two directions perpendicular to each other.

6. The energy generation device according to claim 1, further comprising a sun tracking system adapted to determine a sun orientation/position or/and a sunlight direction.

7. The energy generation device according to claim 6, further comprising:

an orientation system adapted to modify an orientation of the reflection panel, and a control system adapted to control the orientation system on a basis of data received by the sun tracking system.

8. The energy generation device according to claim 1, characterized in that the reflective lamellas are flat and/or adjacent surfaces.

9. The energy generation device according to claim 1, characterized in that the reflection panel is a dichroic mirror made of at least a facet.

10. The energy generation device according to claim 1, characterized the energy generation module is selected from the group consisting of an electricity generation module using photovoltaic cells, a module for heat generation, and a module for hydrogen production.

11. The energy generation device according to claim 1, characterized a backside of the energy generation module presents a reflective surface, a light scatterer, contains fluorescent materials, and/or is an energy-generating surface.

12. An energy generation system comprising a plurality of energy generation devices according to claim 1, further comprising one or several beams each holding a plurality of devices from a bottom part of the plurality of devices and/or cables hanging the energy generation devices from a top of the plurality of devices.

* * * * *